United States Patent [19]

Arai

[11] Patent Number: 5,061,366
[45] Date of Patent: Oct. 29, 1991

[54] SCRAPER FILTER SYSTEM

[75] Inventor: Koichi Arai, Kanagawa, Japan

[73] Assignee: Arai Corporation, Japan

[21] Appl. No.: 513,639

[22] Filed: Apr. 24, 1990

[30] Foreign Application Priority Data

Apr. 28, 1989 [JP] Japan .................................. 1-107834
Aug. 31, 1989 [JP] Japan .................................. 1-223302

[51] Int. Cl.⁵ ........................................... B01D 29/64
[52] U.S. Cl. .................................... 210/111; 210/238;
210/415; 210/431; 210/433.1; 210/497.1;
210/498; 100/117; 100/147; 100/148; 100/149
[58] Field of Search ............... 210/415, 107, 111, 117,
210/137, 238, 413, 414, 429, 431, 433.1, 497.1,
498; 100/111, 117, 148, 149, 147

[56] References Cited

U.S. PATENT DOCUMENTS 3,154,007 10/1964 Schaub et al. ....................... 210/111
3,695,173 10/1972 Cox ..................................... 210/415
3,919,087 11/1975 Brumagim ........................... 210/415

FOREIGN PATENT DOCUMENTS 1259897 11/1986 Japan .................................. 210/413
262840 3/1926 United Kingdom ............... 210/415

Primary Examiner—W. Gary Jones
Assistant Examiner—Matthew O. Savage
Attorney, Agent, or Firm—Dykema Gossett

[57] ABSTRACT

A scraper filter system, which comprises a screw-formed spiral impeller within a cylindrical filter element, and scraper means formed along the spiral end of the impeller for engagement with the internal surface of the filter element for scrapingly removing solid components deposited on the surface of the filter element.

Further the present invention provides a filter system, which comprises a cylindrical filter element, a cylindrical casing allowing liquid components to flow from the inside to the outside through the filter element, a spiral impeller with the scraper means for engagement with the internal surface of the filter element for removing solid components, and further comprises a feed liquid inlet at one end of the cylindrical casing and filter cake discharge means including a cake discharge outlet at the outlet end of the casing.

2 Claims, 5 Drawing Sheets

SCRAPER FILTER SYSTEM

BACKGROUND OF THE INVENTION

1. Field of the Invention

The present invention relates to a filter system in use for filtration of liquids of either food or industrial materials containing liquid and solid components, and more particularly to a novel scraper filter system suitable for processing highly viscous liquids or slurries.

2. Description of the Prior Art

In general, filtration of highly viscous substances such as liquids or slurries of soybean, ground fish meat, or devil's tongue starch has been usually performed through the multi-step filtration including filters having gradually decreased filter openings or using mesh filters.

Various forms of scraper filters are known. However, no filters by which filtered residue can be effectively separated as complete filter cakes, are known.

Previously, the applicant disclosed an improved technology on liquid separation in Japanese patent application No. 32874/1989.

The filter system disclosed therein comprises a cylindrical filter element, a cylindrical drum, and a spiral impeller provided with scraper means. The scraper means disclosed therein comprises a plurality of support rods retained to the spiral impeller for supporting scrapers, which engage with the internal surface of the filter element.

In the case of the filter system, since the scraper means is formed separately from the spiral impeller, further including support stays, the filtered residue generated from a sticky liquid was not sufficiently removed to cause blinding and stoppage of filtration.

SUMMARY OF THE INVENTION

In view of the aforementioned disadvantages, an object of the present invention is to provide a scraper filter system, in which a feed liquid to be filtered is axially conveyed by a spiral impeller within a cylindrical or conical filter element, wherein scraper means is provided around the spiral edge line of the spiral impeller for engagement with the internal surface of the filter element for scrapingly removing the residue of filtered liquid deposited on the internal surface.

Another object of the invention is to provide a filter system, in which the scraper means can resiliently engage with either internal or external surface of the filter element.

A further object of the invention is to provide a scraper filter system comprising: a filter element of a cylindrical form having a filter slit formed in a definite shape along the internal surface thereof; a cylindrical casing selectively holding the filter element for allowing liquid components to flow from the inside to the outside through the filter element; a spiral impeller provided with scraper means rotatably disposed within the filter element; a feed liquid inlet provided on one end of the cylindrical casing; and filter cake discharge means provided on the open end of the cylindrical casing.

A still further object of the invention is to provide filter cake discharge means for a scraper filter system, which comprises: closing means including an operating wheel, a threaded shaft and a closing member; and support means in engagement with the threaded shaft for supporting the closing means; whereby the clearance between the external fringe of the closing member and the internal fringe of the discharge outlet is adapted to be varied.

A still further object of the invention is to provide filter cake discharge means for a scraper filter system, which comprises: a filter cake discharge outlet including a plurality of radiated support members for supporting one end of the rotating shaft of the spiral impeller and an arcuate member retained to the end of the cylindrical casing for supporting the support members; a support frame for supporting the arcuate member; a retainer plate for retaining the frame; a threaded sleeve having an inner surface threaded to mesh with the threaded shaft of the closing means and having an outer surface threaded to mesh with the support frame; and a wheel secured to the threaded sleeve and operative for axially moving the threaded sleeve in the longitudinal direction.

DETAILED DESCRIPTION OF PREFERRED EMBODIMENTS

Figure 1:
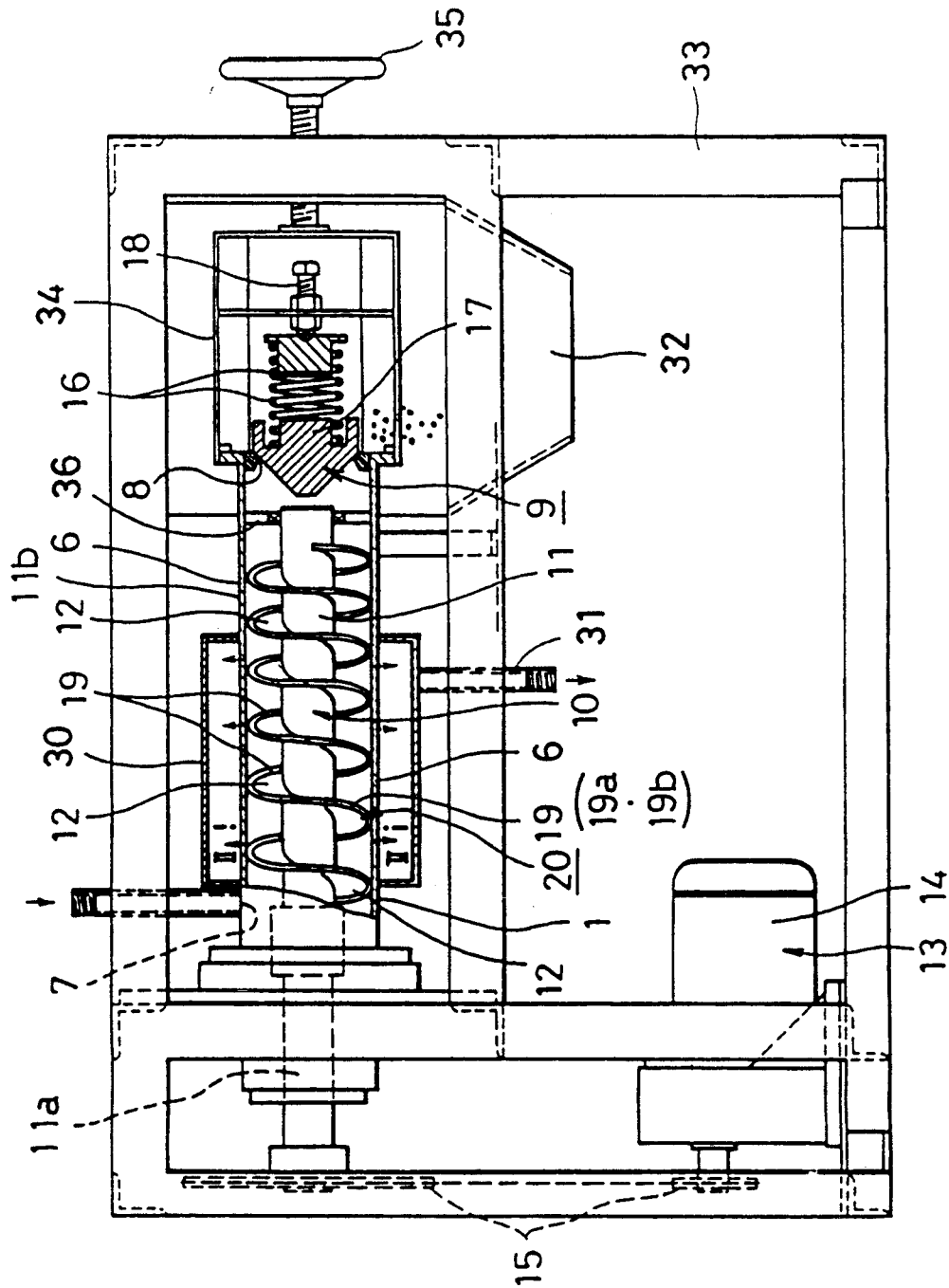
FIG. 1 is a side view partly cut away of a scraper filter system according to the present invention.

Preferred embodiments according to the invention will now be described with reference to the accompanying drawings.

The embodiment described herein is suitable for soy milk separation from soybean slurry.

A reference numeral 1 denotes a cylindrical filter element, which comprises a wire rod filter member 2 having a triangular section wound as a spiral form around an inner surface of a cylindrical support member 3 having a plurality of flow holes. The wire member 2 is retained with its accute apex 2b in a spiral groove 4 formed along the inner surface of support member 3, so as to permit all adjacent surfaces a of wire member 2 to be retained adjacent to each other, leaving a spiral filter slit 5 of a definite width around the surface.

A reference numeral 6 denotes a cylindrical casing selectively enclosing one or more filter element 1. At one end of the casing 6, a feed liquid inlet 7 is provided. At another end, a filter cake discharge assembly 9 including a discharge outlet 8 is enclosed.

Figure 2:
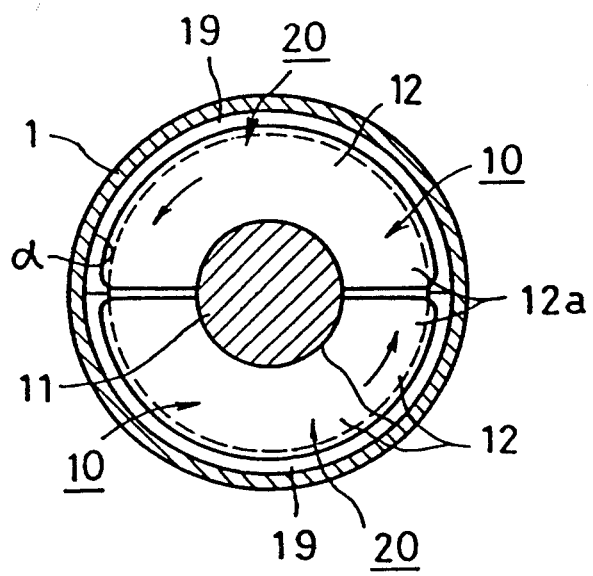
FIG. 2 is a sectional view of the system taken along the line II—II of FIG. 1.
Figure 3:
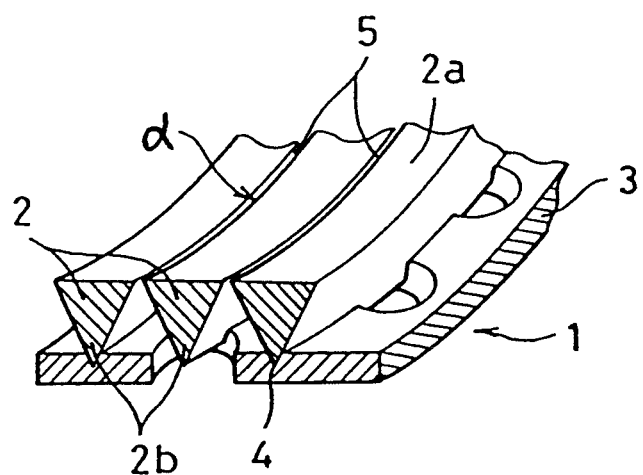
FIG. 3 is an enlarged fragmentary perspective sectional view of a cylindrical filter element.

As shown in FIG. 2, a screw member or rotor 10 is formed of a screw-formed spiral impeller 12. The spiral impeller 12 consists of a plurality of discrete blades 12a secured to the rotating shaft 11, and is rotatably supported within the filter element 1 so as to leave a small clearance against the internal surface of filter element 1.

Alternatively, the spiral impeller 12 can be formed as an integral member (not illustrated) instead of discrete blades 12a.

As shown in FIG. 1, spiral impeller 12 is formed to have a definite diameter throughout the length thereof. The spiral is formed so as to convey the liquid in the direction from the inlet 7 to outlet 8, and is further formed so that the pitch gradually decreases as the outlet 8 is approached for applying an efficient squeeze effect on the liquid.

As hereinafter illustrated in FIG. 5, by successively increasing a diameter of shaft 11 with the pitch size maintained, the same effect is also attained for increasing squeeze filter operation.

A double or triple spiral impeller, which is provided around the shaft 11, can also increase such squeeze effect (not illustrated).

Drive means 13 including an electric motor 14 is provided for driving the driven shaft 11 of spiral impeller 12 through the reduction means including pulleys and a belt, or suitable gearing. The driven shaft 11 is rotatably supported at both 11a and 11b.

A filter cake discharge assembly 9 includes a pressing valve 17 which is urged by coil spring 16 so as to close a slightly narrowed opening 8, and a threaded rod 18 for adjustment of spring action of spring 16, for controlling squeeze effect applied to the filter cakes to be discharged.

A scraper means is comprised of a scraper member, which is attached to the spiral impeller 12, so as to engage with the sliding surface a of filter element 1.

Figure 4A:
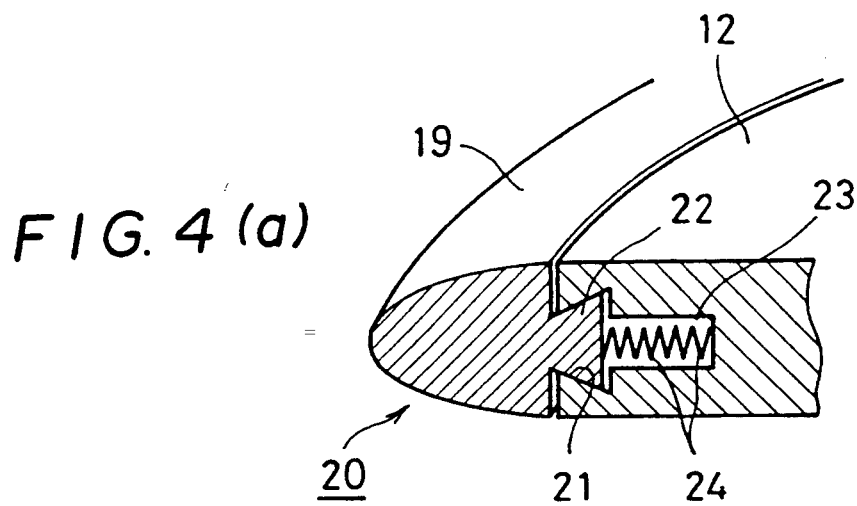
FIG. 4 is an enlarged fragmentary perspective sectional view of three forms of scraper means.

FIG. 4(a),(b) and (c) illustrate various forms of scraper means.

FIG. 4(a) shows an outer edge of spiral impeller 12 provided with a tapered groove 21 for receiving an tapered projection 22 of scraper member 19, and with a small recesses 23 for receiving a spring 24 for resiliently urging the end surface of projection 22. Spring member 24 can be omitted, when scraper member 19 is of wear resistant and suitable flexibility.

Figure 4B:
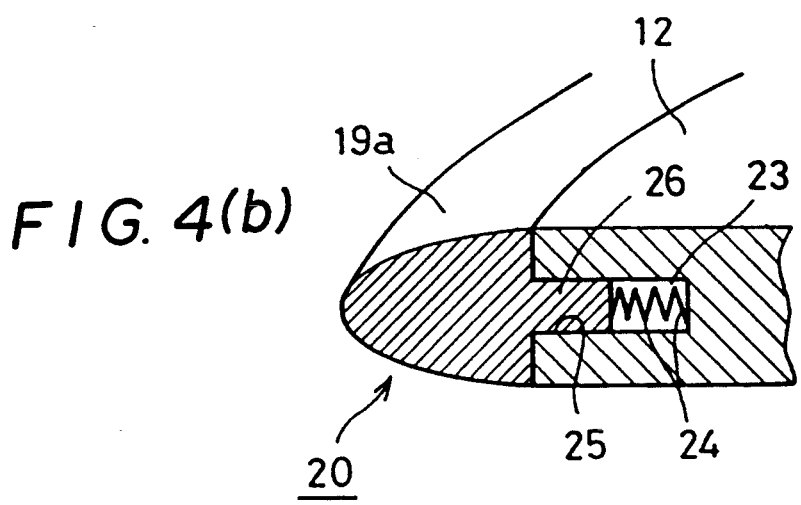

FIG. 4(b) shows a slightly modified form of scraper member 19, on which a simplified projection 26 instead of tapered projection 22 is provided, which is retained in a groove 25 of spring impeller 12.

The scraper member 19a is also urged by a spring member 24, which can be omitted according to the material of scraper 19a.

Figure 4C:
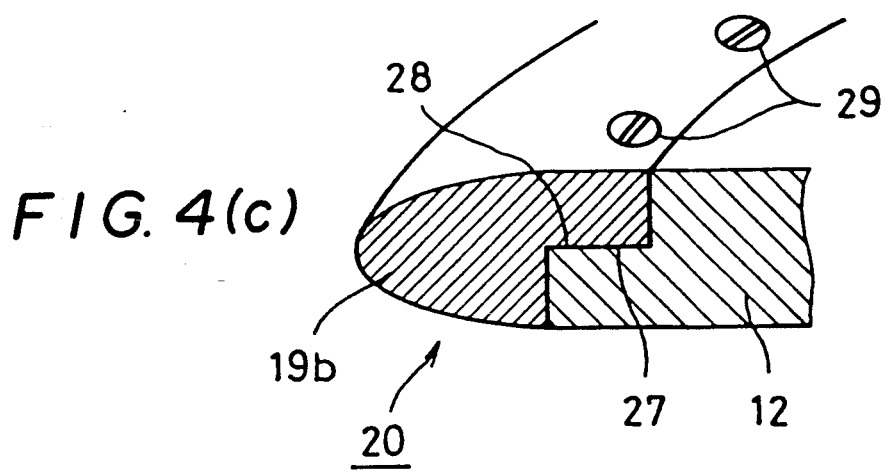

FIG. 4(c) shows another form of scraper means, in which a scraper member 19b having a cutout 27 is retained to a corresponding shoulder 28 of spiral impeller 12 by retainer screws 29.

In each form, scraper member 19 is preferably formed of a wear resistant synthetic resin, and can be either in form of a continuous single member or spaced discrete members.

Returning to FIG. 1, around filter element 1 is formed a filtrate collection cylinder 30, to which a filtrate outlet 31 is attached. A numeral 32 denotes a hopper beneath the outlet 8, 33 a frame, and 34 an enclosure cylinder. The cylinder 34, attached to the outlet end 8, supports the discharge outlet 8. Screw member 10 is supported at its end by frame 36.

In operation of the filter system, a feed liquid to be filtered such as raw soybean slurry is supplied from the feed liquid inlet after screw member 10 is rotated by drive means 13. As the liquid is transported according to the rotation of the spiral impeller 12 through the cylinder, the filtrate passed through filter slit is collected as soybean milk, which is drained through filtrate outlet 31.

Even in the case of processing a substance such as soybean slurry, which is adhesive and sticky, the filter cakes can be readily removed, because the spiral impeller 12 according to the invention has no obstacle to prevent removing of the deposit of filter cakes, such as a stay for supporting the scraper means. As a result, filter cakes are successively transferred without causing blinding of filter elements during filter operation.

The density of the filter cakes is gradually increased as the outlet is approached, that is, the liquid component decreases and solid component increases. A filter cake containing a desired quantity of liquid can be intermittently discharged, by controlling the cake discharge assembly 9.

More precisely, the liquid content of the resulting cakes can be controlled in accordance with the compression of spring member 16, which is adjusted by threaded rod 18. As a result, the produced filter cakes are controlled so as to contain a desired moisture.

Instead of a wire rod 2 forming a filter slit 5, another arrangement including such as a punching metal or any of porus materials, forming different type of filter openings, can be also utilized for the filter element 1.

In addition, the cylindrical casing 6 can be also vertically installed other than laterally.

The filter element can be formed in conical as well as cylindrical. Also, the spiral impeller 12 can be disposed outside the filter element other than inside thereof.

According to the construction, the deposited cake can be effectively removed by scraper means 20 of the invention.

Further, the scraper means, together with a spring member, is effective for producing squeeze filtration by an adequate pressure applied on filter surface.

Figure 5:
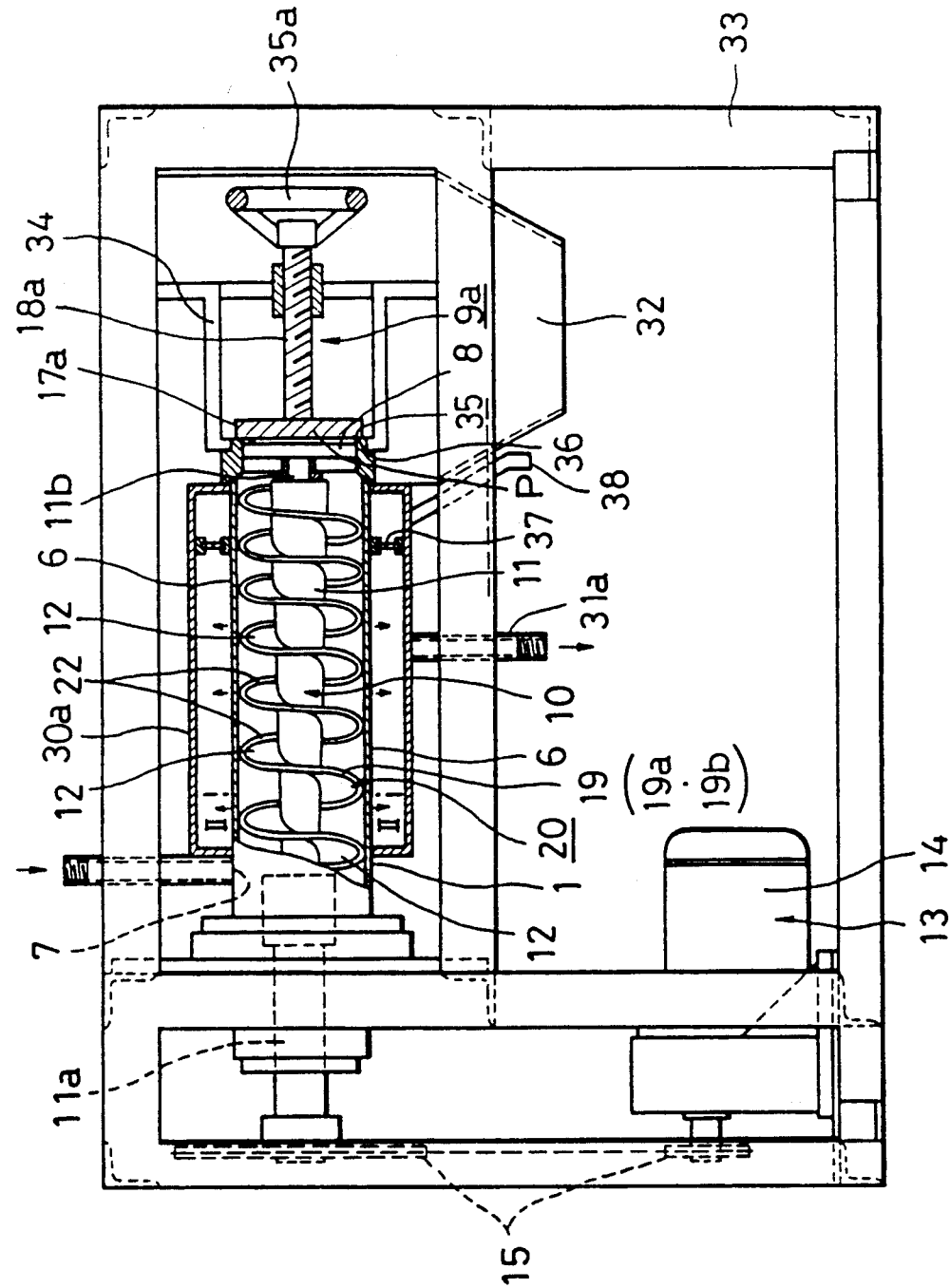
FIG. 5 is a side view of another embodiment according to the invention showing a filter system.

As to a modified embodiment shown in FIG. 5, the fundamental construction of which is similar to that shown in FIG. 1, the principal difference is in the construction of the filter cake discharge assembly.

The filter cake discharge assembly 9a comprises: closing means P including a wheel 35a, a threaded shaft 18a and a closing member 17a; and a support frame 34, to which the threaded shaft 18a is supported. Engagement of the chamfered surface 35 of closing member 17a with the chamfered surface 36 of cake outlet 8 is adjusted so as to vary the outlet size.

Another difference in construction is in the filtrate outlet.

A cylindrical drum 30a for filtrate collection is disposed to enclose the filter element 1. Between the drum 30a and the external surface of filter element 1, a sealing 37 is disposed adjacent to the filter cake discharge outlet 8 to form a partition for preventing solid components undesirably leaked through filter slit 5 from being mixed with normally filtered solution. Such solid components are drained through an auxiliary conduit 38. A filtrate outlet 31a is disposed for collecting the normal filtrate from the drum 30a.

In operation of the filter system, a feed liquid to be filtered such as soybean raw slurry is fed through the feed liquid inlet after screw member 10 is rotated by drive means 13. As the liquid is transported according to the rotation of the spiral impeller 12 through the cylinder, the filtrate passed through filter slit is collected as soybean milk, which is drained through filtrate outlet 31a.

Even in the case of processing a substance such as soybean slurry, which is adhesive and sticky, the filter cakes can be readily removed, because the spiral impeller 12 according to the invention is free from any obstacles, such as stays for supporting the scraper means which can prevent removing of deposited filter cakes. As a result, filter cakes are successively transferred without causing bliding of filter elements during filter operation.

As the spiral impeller 12 is rotated, the filter cakes are successively pushed forward. The density of filter cakes is gradually increased as the discharge outlet is approached, that is, the liquid content gradually decreases.

In addition, the rotary shaft 11 can be formed to successively increase its diameter, and spiral impeller 12 is formed to decrease its pitch, thereby increasing squeeze effect to gradually accumulate filter cakes near the cake discharge outlet 8.

The clearance between the chamfered fringes of closing member 17a and discharge outlet 8 can be adjusted by timely operating the wheel. As a result, filter cakes containing a desired moisture content can be discharged.

For further improving the adjustment of moisture content of filter cakes, although not illustrated, an appropriate indication, such as indication of rotating angle, may be provided on the wheel 35a.

Figure 6:
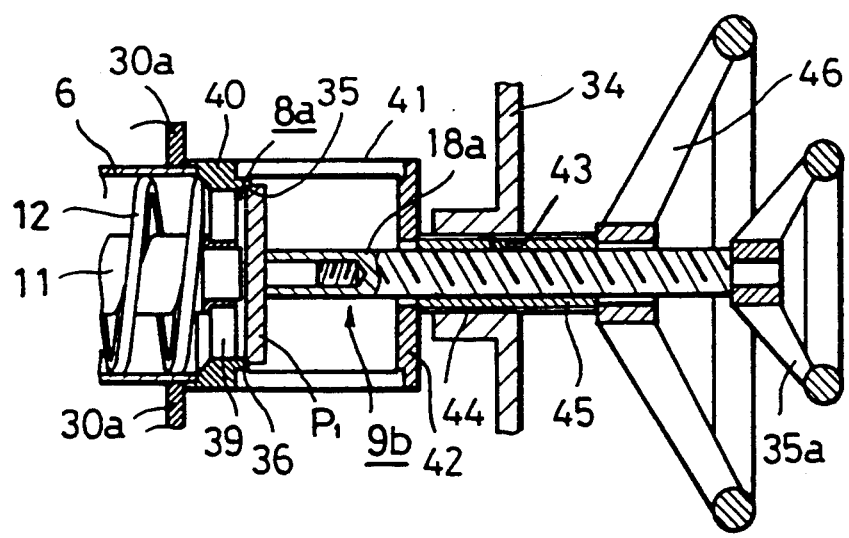
FIG. 6 is a side view of partly modified embodiment of FIG. 5.

FIG. 6 illustrates a still further embodiment of a filter cake discharge assembly 9b.

The discharge assembly 9b is comprised of: a filter cake discharge outlet 8a which includes a plurality of radiated supports 39 for supporting one end of a rotating shaft 11 located at the outlet end of a cylindrical casing 6, and an arcuate member 40 retained to the end of the cylindrical casing 6 for supporting the supports 39; a support frame 41 for supporting the arcuate member 40; a retainer plate 42 for retaining the frame 41 ; a threaded sleeve 45; and a wheel 46 operative to move the threaded sleeve 45 in the longitudinal direction for engagement with the area surrounding the hole in the retainer plate 42.

More precisely, the threaded sleeve 45 is penetrated with a threaded hole 43, which meshes a threaded shaft 18a of the closing means P1 on the same axis of rotating shaft 11 so as to conform the center of retainer plate 42. Further, sleeve 45 is provided with a threaded groove 44 on its outer surface, so as to mesh with a threaded opening in a retainer frame 34.

In this design, operation of an additional wheel 46 permits the discharge assembly 9a to be separated from cylindrical casing 6 and and enables overhaul and cleaning.

As stated above, according to the invention, the feed liquid is filtered through a cylindrical filter element under pressure, the deposited filter cakes from even highly viscous slurries are readily removed by appropriately designed scraper means without causing blinding of filtration, and the cakes are smoothly conveyed and easily discharged as necessary.

The scraper means, which rotates and scrapingly engages with the filter surface, enables to increase squeeze filtration effect.

Also, the filter cake discharge means enables to control the produced filter cakes in any desired moist condition by adjustment of opening extent of the outlet with operation of a wheel. The discharge assembly is also easily disassembled for overhaul and cleaning.

Accordingly, the filter system is suited for food industry, such as separation of soybean milk and beancurd refuse from soybean slurry or preparation of edible oil, and is also applied for separation of machine oil.

The filter system of the invention, although designed for highly viscous fluids, is also suitable for filtration of fluent liquids.

What is claimed is:

1. A scraper filter system comprising:
a filter element of a cylindrical or conical form having a filter slit formed in a spiral shape along an internal surface thereof;
a spiral impeller mounted for rotation with respect to a longitudinal axis along the internal surface of said filter element; scraper means including a scraper member disposed within a groove formed in an outer edge; and spring means disposed between a bottom portion of said groove and said scraper member for biasing said scraper member against said internal surface for scrapingly removing the residue of filter liquid deposited on said internal surface wherein said scraper means is movable with respect to said impeller and resiliently engages with said internal surface of said filter element.

2. A scraper filter system comprising:
a filter element of a cylindrical form having a filter slit formed in a spiral shape along the internal surface thereof;
a cylindrical casing selectively holding said filter element for allowing liquid components to flow from the inside to the outside through said filter element;
a spiral impeller provided with scraper means rotatably disposed within said filter element with respect to longitudinal axis of said filter element;
a feed liquid inlet provided on one end of said cylindrical casing;
a filter cake discharge means provided on the other end of said cylindrical casing, said filter cake discharge means comprising:
an arcuate member removably retained on said other end of said cylindrical casing and having a plurality of radially extending support members, said radially extending support members supporting one end of said spiral impeller for rotation;
a support frame in axial alignment with said other end of said cylindrical casing having one end engaging said arcuate member for retaining said arcuate member on the other end of said cylindrical casing;
a retainer plate provided on said support frame at an opposite end from said arcuate member and having an opening in axial alignment with said impeller;
a retainer frame member in axial alignment with said arcuate member and having a threaded opening in axial alignment with said impeller;
a threaded sleeve engaging said threaded opening in said retainer frame having internal threads for engaging a threaded shaft and having one end sized so as to engage an area located about the opening in said retainer plate;
a threaded shaft threadably engaged in said internal threads of said threaded sleeve and having a closure member on one end for closing said arcuate member and a handle on the other end for rotation thereof; and
a wheel connected to the other end of said threaded sleeve to move said threaded sleeve into and out of said threaded opening in said retainer frame and thereby retain and release said retainer plate and said support frame.

* * * * *